(12) United States Patent
Wanqin et al.

(10) Patent No.: US 8,203,075 B2
(45) Date of Patent: Jun. 19, 2012

(54) BIPV JUNCTION BOX

(75) Inventors: Ji Wanqin, Shanghai (CN); Wu Hui-Meng, Shanghai (CN); Wang Dong, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 344 days.

(21) Appl. No.: 12/503,545

(22) Filed: Jul. 15, 2009

(65) Prior Publication Data

US 2010/0012343 A1    Jan. 21, 2010

(30) Foreign Application Priority Data

Jul. 18, 2008    (CN) ...................... 2008 2 0125900 U

(51) Int. Cl.
*H05K 5/06* (2006.01)
(52) U.S. Cl. .......... 174/50; 174/50.5; 439/567; 136/252
(58) Field of Classification Search ............ 174/51, 174/50.52, 50, 50.55; 439/567, 535; 136/244, 136/252; 248/906; 220/4.02
See application file for complete search history.

(56) References Cited

U.S. PATENT DOCUMENTS 7,337,903 B2 *    3/2008    Lauri ........................... 206/350

* cited by examiner

*Primary Examiner* — Dhirubhai R Patel
(74) *Attorney, Agent, or Firm* — Barley Snyder

(57) ABSTRACT

The present invention provides a building integrated photovoltaic (BIPV) junction box having a housing and a connection assembly disposed within the housing. The housing includes first sidewalls positioned opposite to each other and second sidewalls adjacent and connecting to the two first sidewalls. Additionally, an opening is provided opposite a bottom wall, with the bottom wall connecting the first and second sidewalls. The second sidewalls include extensions that extend beyond a height of the first sidewalls, so that an edge of a solar cell panel is sandwiched between the extensions when the junction box is mounted on the edge of the solar cell panel. The BIPV junction box of the present invention may be applied to the connection of BIPV solar cell modules.

20 Claims, 7 Drawing Sheets

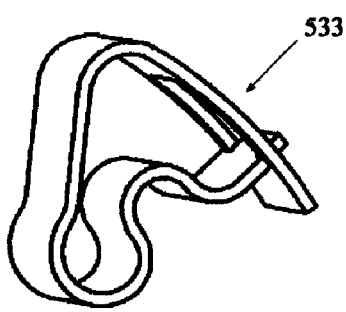
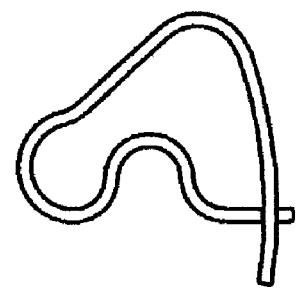
Fig. 4A  Fig. 4B
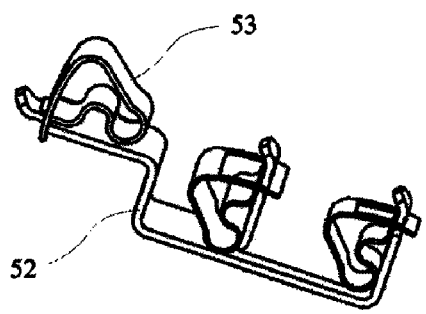
Fig. 5A
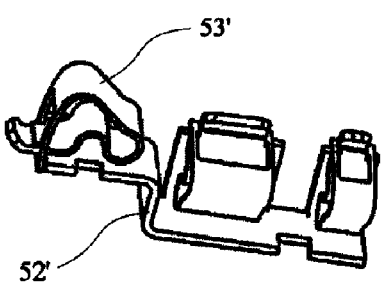
Fig. 5B

US 8,203,075 B2

BIPV JUNCTION BOX

CROSS-REFERENCE TO RELATED APPLICATIONS

This application claims the benefit of the filing date under 35 U.S.C. §119(a)-(d) of Chinese Patent Application No. CN 200820125900.0, filed Jul. 18, 2008.

FIELD OF THE INVENTION

The present invention relates to a building integrated photovoltaic (BIPV) device, and more particularly, to a junction box for BIPV glass panel.

BACKGROUND

Solar energy is a form of renewable energy. In recent years, the technology of converting the solar energy to electrical energy has attracted great public attention, since this conversion can save energy and minimize the power shortages, while reducing environment pollution.

A typical way of utilizing solar energy is through a solar cell assembly (or photovoltaic assembly), which is mounted on a roof through supports. Junction boxes are generally used for the solar cell assembly, being provided on the back surface of the assembly.

Recently, new technology for utilizing solar energy has been developed. More specifically, building integrated photovoltaic (BIPV) technology has been developed to further harness the use of solar energy. BIPV technology uses common solar energy (photovoltaic) devices, however, the BIPV technology utilizes building parts, such as transparent roof, window or glass walls instead of supports on a roof. While these photovoltaic devices can keep out wind and rain and transmit sunlight, they can also generate an abundance of electricity. However, conventional junction boxes for solar cell modules are not compatible and generally unaesthetic when mounted on windows or the like, considering the large size of known solar junction boxes.

One known solution is to hide connecting assembles in window frames or the like without using the junction box. However, without protection of the junction boxes, the connecting assembles are susceptible to external impacts, humidity and dust.

SUMMARY

Therefore, the present invention has been made in view of the above problems, and provides a junction box for a BIPV device, which can protect a diode assembly without deteriorating the appearance of a building having the BIPV device.

The building integrated photovoltaic (BIPV) junction box, includes a housing and a connection assembly disposed within the housing. The housing includes first sidewalls positioned opposite to each other, second sidewalls adjacent to and connecting the first sidewalls, and an opening opposite a bottom wall connecting the first and second sidewalls. The second sidewalls have extensions beyond a height of the first sidewalls, so that an edge of a solar cell panel is sandwiched between the extensions when the junction box is mounted on the edge of the solar cell panel.

BRIEF DESCRIPTION OF THE DRAWINGS

FIG. 4A is a perspective view of a spring clamp according to the present invention;

FIG. 4B is a front view of the spring clamp shown in FIG. 4A;

FIG. 5A is a perspective view showing assemblies consisting of spring clamps and conductive rails according to the an embodiment of the present invention;

FIG. 5B is a perspective view showing assemblies consisting of spring clamps and conductive rails according to another embodiment of the present invention;

DETAILED DESCRIPTION OF THE EMBODIMENTS

Figure 1:
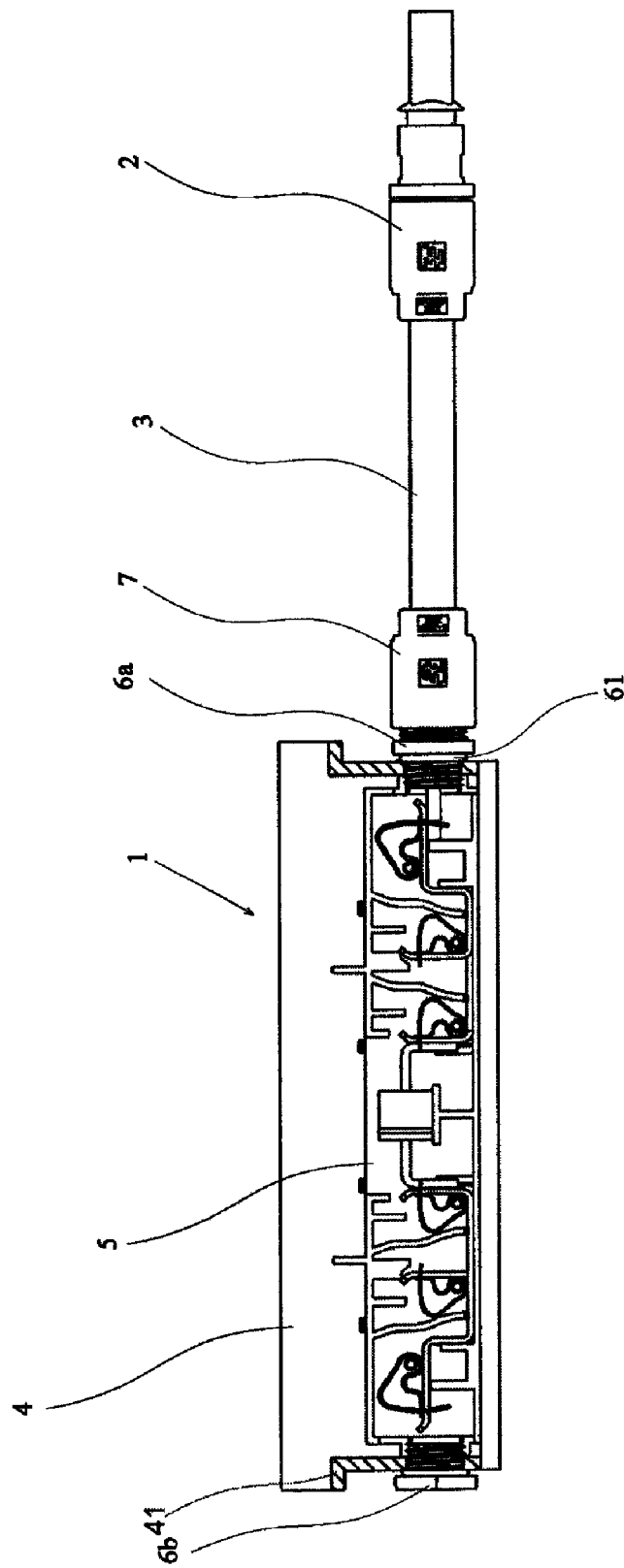
FIG. 1 is a partial section view of a BIPV junction box, being connected to an external cable, according to an embodiment of the present invention.

Referring to FIG. 1 and according to an embodiment of the present invention, a BIPV junction box 1 is shown in which some sidewalls of a housing 4 have been removed to show the inner structure of the junction box 1. The junction box 1 has one end connected with an external cable 3 and the other end sealed by a blocking bolt 6b. In the embodiment shown, the junction box 1 includes the housing 4 with a connection assembly 5 disposed within the housing 4. The connection assembly 5 may be used to connect leads of solar cell modules, external cables 3 and bypass diodes, etc.

Figure 2:
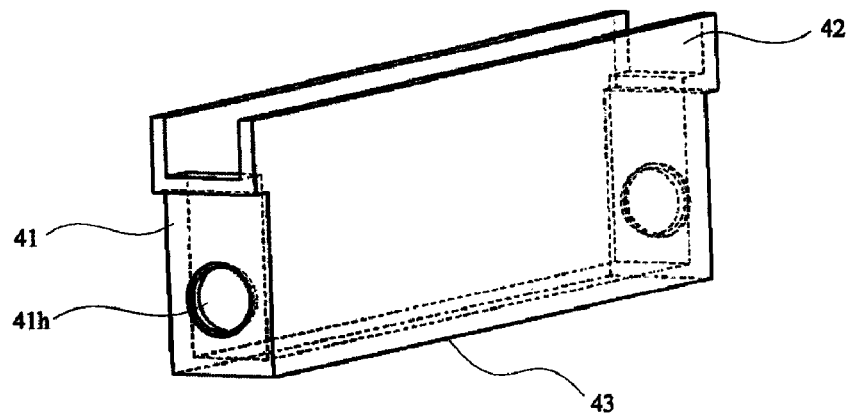
FIG. 2 is a perspective view of a housing of the junction box according to the an embodiment of the present invention.

With reference to FIG. 2, the housing 4 may have a shape of a rectangular parallelepiped box in general, which has a closed bottom and an opened top. Receiving passageways 41h are formed in first sidewalls 41, at both ends of the housing 4, so that the external cable 3 may be connected to the connection assembly 5 through one of the receiving passageways 41h. Second sidewalls 42 of the housing 4, extending in a lengthwise direction of the housing 4, have extensions higher than a height of the first sidewalls 41, and the distance between the opposite extensions may be consistent with the thickness of an edge portion of a solar cell panel 81 for installing the junction box 1 thereon. This is designed so that the edge portion of the solar cell panel 81 may be sandwiched between the opposite extensions when the junction box 1 is mounted. Optionally, each of the first sidewalls 41 may have a folded part at the top side, away from a bottom wall 43, which may extend outwards in the lengthwise direction of the housing 4. In this case, the extensions of the second sidewalls 42 may extend in the lengthwise direction of the housing 4 to outer edges of the folded parts of the first sidewalls 41. The folded parts of the first sidewalls 41 may increase contact area between the junction box 1 and the edge of the solar cell panel 81, and thus enhance the mounting stability and the sealing effect. However, the folded parts at the top sides of the first sidewalls 41 are not indispensable, and the designs of the extensions of the second sidewalls 42 may be varied, for example the edges of the extensions may be curved, as long as the inner space of the housing 4 can be closed when the housing 4 is mounted to the edge portion of the solar cell panel 81.

In the embodiment shown, the two second sidewalls 42 of the housing 4 may be parallel to each other corresponding to the parallel configuration of opposite surfaces of the solar cell panel 81. However, the shape of the housing 4 may be varied in accordance with the shape of the solar cell panel 81 so long as the configuration of the sidewalls of the housing 4 allows hermetic attachment of the housing 4 to the surfaces of the solar cell panel 81. The housing 4 may be made of insulating material.

Figure 3A:
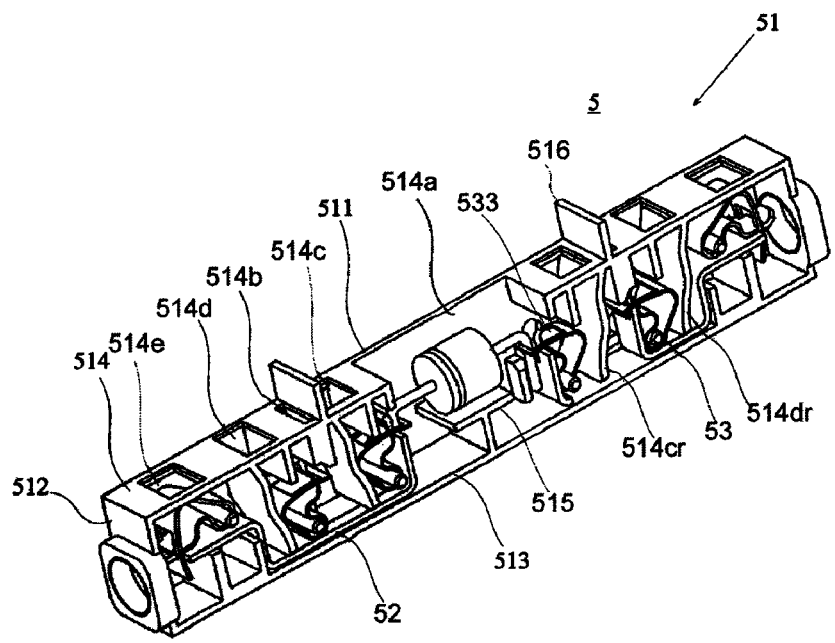
FIG. 3A is a perspective view of a connection assembly according to the an embodiment of the present invention.
Figure 3B:
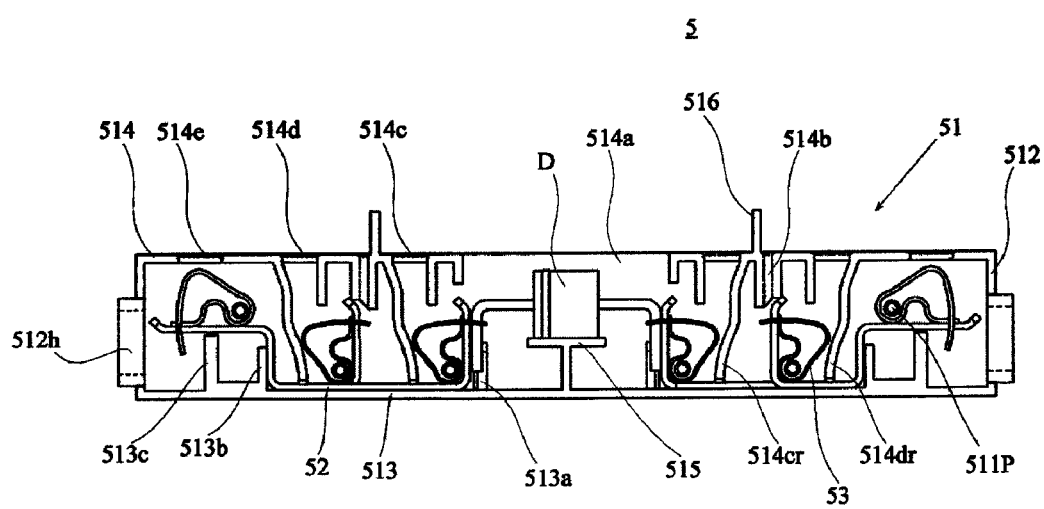
FIG. 3B is a front view of the connection assembly shown in FIG. 3A.

Referring to FIGS. 3A and 3B, the connection assembly 5 includes a chassis 51 and two assemblies consisting of conductive rails 52 and spring clamps 53 installed in the chassis 51.

The chassis 51 has a top wall 511 extending in a lengthwise direction and is opened at the opposite side to the top wall 511 so as to facilitate the installation of the conductive rails 52, spring clamps 53 and the like in the chassis 51. Sidewalls 512 at both ends of the chassis 51 may have screw passageways 512*h* therethrough (the threads of which are not shown in FIGS. 3A and 3B), which may also serve as passages for components i.e., passages for inserting the external cables 3 into the housing 4. Ribs 513*a*, 513*b* and 513*c* extending from a bottom wall 513 toward a top wall 514 may be provided symmetrically on two sides of the chassis 51, wherein the ribs 513*a* and 513*b* may function to limit the positions of the conductive rails 52, and the rib 513*c* may be used to limit the drooping of overhang portions of the conductive rails 52 due to external force. The top wall 514 of the chassis 51 has a first component passage 514*a* formed in the center thereof, and second component passage 514*b* and actuator passages 514*c*, 514*d* and 514*e* symmetrically disposed at two sides of the first component passage 514*a* with respect to the component passage 514*a*. The actuator passages 514*c* allow the insertion of a tool for pressing the spring clamps 53, so that the spring clamps 53 can be opened. Each of the spring clamps 53 has a mouth 533 (as shown in FIG. 4A) facing a corresponding passage. In order to assist the tool for pressing the spring clamps 53, the actuator passages 514*c* and 514*d* have inclined guiding ribs 514*cr* and 514*dr* extending from the top wall 511 at respective openings thereof toward the bottom wall 513 and the corresponding spring clamps 53.

In an embodiment of the present invention, a bypass diode D is installed in the chassis 51 through the primary component passage 514*a*. In the embodiment shown, a supporter 515 is positioned on the bottom wall 513, corresponding to the component passage 514*a*, so that the lowest position of the diode D in the chassis 51 can be limited when it is inserted into the chassis 51.

In the embodiment shown, the leads of the solar cell panel 81 are inserted into the chassis 51 through the secondary component passages 514*b*. Optionally, isolation ribs 516 may be formed on the top wall 514 at edges of openings of the secondary component passages 514*b*, which extend outwards and may assist to prevent the leads of the solar cell panel 81 from contacting each other and shorting.

Referring to FIGS. 4A and 4B, the spring clamps 53 are shown, which may have different dimensions from each other according to practice. When assembling the connection assembly 5, the spring clamps 53 are opened and then clamped with corresponding spring-mounting parts of the conductive rails 52, as shown in FIG. 5A. After assembling the spring clamps 53 and the conductive rails 52 together, the assemblies of the spring clamps 53 and the conductive rails 52 are installed in the chassis 51, such that posts 511*p* formed on the top wall 511 of the chassis 51 are inserted into tails of the spring clamps 53 to assist the restriction of the positions of the spring clamps 53, as shown in FIGS. 3A and 3B.

The two assemblies of the conductive rails 52 and spring clamps 53, shown in the drawings, may have the same structure, and one of the two assemblies of the conductive rails 52 and spring clamps 53 is rotated by 180° with respect to the other in installation. That is, the two assemblies are rotationally symmetrical with respect to a central axis of the chassis 51, which is perpendicular to the bottom wall 513 of the chassis 51.

In the embodiment shown, the chassis 51 may be made of heat resistance insulating material such as polyetherimide (PEI), while the conductive rail 52 and the spring clamp 53 may be made of conductive material such as metal.

Referring to FIG. 1 again, after the connection assembly 5 is mounted within the housing 4, one end of a double-ended screw joint 6*a* is fitted through the screw passageways 512*h* of the chassis 51 through the receiving passageways 41*h* of the housing 4. An O-ring 61 may be placed between a flange in the middle of the double-ended screw joint 6*a* and the first sidewalls 41 of the housing 4 in order to prevent dusts and moisture from entering into the inner space of the junction box 1 through the receiving passageway 41*h*. The blocking bolt 6*b* may be fixed in manner similar to the double-ended screw joint 6*a*. Alternatively, the junction box 1 may also be connected with external cables 3 at both ends thereof. In this case, the blocking bolt 6*b* is replaced by a double-ended screw joint 6*a*.

Next, the use of the junction box 1 will be described. Briefly, the tool for pressing the spring clamps 53 is inserted via the actuator passages 514*c*, 514*d* or 514*e* to press and open one of the spring clamps 53; and at the same time, the bypass diode D, a lead of the solar cell module 813 or a cable is inserted via the first component passage 514*a*, the second component passage 514*b*, or the screw passageways 512*h*, so that one of the terminals of the diode D or other lead is disposed in the mouth 533 (see FIG. 1) of the spring clamp 53 between a corresponding spring-mounting part of the conductive rail 52 and an edge of the mouth 533. Then, the tool is withdrawn, and the spring clamp 53 is restored to securely fix the terminal of the diode D or the other lead on the conductive rail 52 and achieve excellent electrical connection. Although the connection of the bypass diode D, the lead of the solar cell module 813 or the cable and the junction box 1 is described as above, this description is only for the purpose of facilitating an understanding of the invention, and those skilled in the art can determine flexibly according to particular conditions the time to connect respective components or leads. For example, the diode D may be mounted after assembling the connection assembly 5, or after installing the connection assembly 5 into the housing 4 and fitting the double-ended screw joint 6*a* and the blocking bolt 6*b* into the screw passageways 512*h* of the chassis 51, or mounted at the construction site. The cable 3 may be installed after installing the connection assembly 5 into the housing 4 and fitting the double-ended screw joint 6*a* and the blocking bolt 6*b* into the screw passageways 512*h* of the chassis 51, or installed at the construction site. Furthermore, the leads of the solar cell module 813 may be mounted at the construction site.

Referring to FIG. 1 again, one end of the double-ended screw joint 6*a* exposed outside the housing 4 serves to mount a screw joint 7 of the cable 3. The cable 3 may have a distal end provided with a male or female connector 2 so that it can be connected to another cable.

Further, in the case that no external cable 3 is necessary, both ends of the junction box 1 may be closed by blocking bolts 6*b*. Alternatively, the sidewall(s) 41 may have no receiving passageways 41*h* (see FIG. 2) at one or two ends of the housing 4 not connecting with the cable 3. Also, the spring clamp 53, adjacent to the sidewall 512 of the chassis 51 for connecting the cable 3, may be eliminated if the cable 3 is not connected to the junction box 1 at the sidewall 512.

Figure 6:
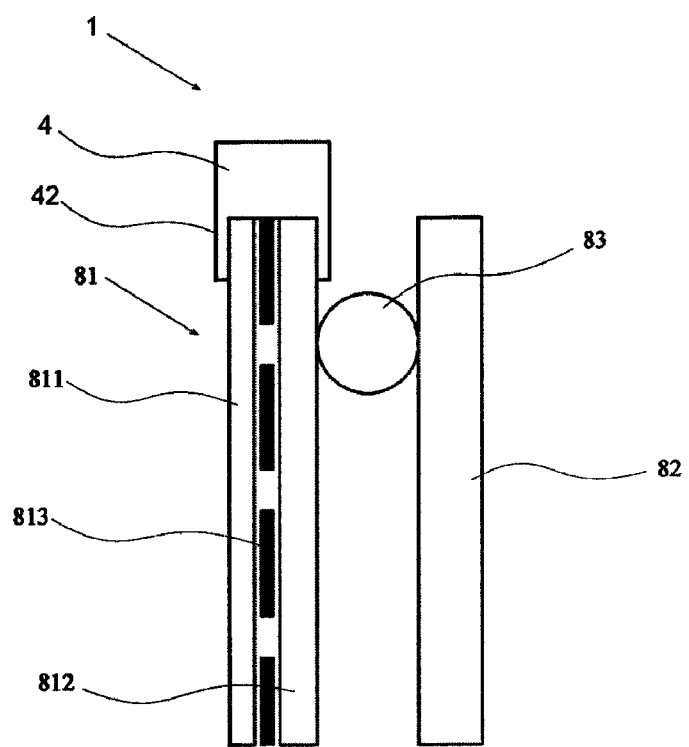
FIG. 6 is a side view schematically showing the junction box according to the first embodiment of the present invention in a state of being mounted on a BIPV glass panel.

Next, the installation of the BIPV junction box 1, according to invention, will be described with reference to the schematic view of FIG. 6. The BIPV glass panel shown in FIG. 6 is a typical BIPV glass panel, which includes a solar cell panel 81 and a glass plate 82 with a space maintained between by spacers 83. The solar cell panel 81 includes two glass plates 811 and 812 and a solar cell module 813 sandwiched between the glass plates 811 and 812. FIG. 6 shows that an edge portion of the solar cell panel 81 is inserted and clamped between the two extensions of the second sidewalls 42 of the housing 4. Upon assembly, the junction box 1, according to the embodiment shown, may be mounted at the construction site, where the leads (not shown) of the solar cell module 813 are connected to the connection assembly 5, and then an adhesive such as silica gel is coated on surfaces of the second sidewalls 42 of the housing 4 of the junction box 1 that will contact the edge portion of the solar cell panel 81. Next, the junction box 1 is placed on the edge of the solar cell panel 81 in such a manner that the opening of the housing 4 faces the solar cell panel 81, so that the edge portion is inserted between the two second sidewalls 42 of the housing 4 in the lengthwise direction and a side surface of the solar cell panel 81 is in contact with the top of the first sidewalls 41 of the housing 4, and thus the junction box 1 is adhered on the solar cell panel 81. As a result, the junction box 1 is hermetically mounted on the edge of the solar cell panel 81 with the adhesive of silica gel.

The BIPV junction box 1 according to the present invention is not filled with sealant as is done in the prior art, and thus it is easy and convenient for those skilled in the art to repair or replace fault components.

The BIPV junction box 1 according to the present invention is mounted on the edge portion of the solar cell panel 81 and has substantially the same thickness as that of the solar cell panel 81 due to the design of the housing 4. As a result, the junction box 1 can be hidden in the window frame (not shown) easily, which achieves the object of providing good looks while effectively preventing the components therein from being damaged due to external impacts, dusts, and/or moisture.

Since the connection assembly 5 of the BIPV junction box 1 according to the present invention includes spring clamps 53, the connection of leads or conductive wires is easy, quick, and fast, and the excellent electrical connection may be ensured.

The above embodiments are not to limit the scope of the present invention, and those skilled in the art may make various changes of them. For example, instead of the separate double-ended screw joint 6*a*, a screw joint matching the screw joint 7 of the cable may be integrally formed on the first sidewalls 41 of the housing 4. In this case, although the manufacture of the housing 4 is complicated, the hermetic connection between the cable 3 and the junction box 1 becomes simpler and more reliable. Further, latch pairs may be formed on the chassis 51 and the sidewalls of the housing 4, so that the connection assembly 5 may be securely installed within the housing 4 using the latch pairs. In addition, those skilled in the art may modify the connection assembly 5 illustrated in the embodiments so long as it can connect leads or conductive wires reliably.

Hereinafter, another embodiment of the present invention will be described with reference to FIGS. 7A, 7B, and 8, in which components like those in the first embodiment are denoted by like reference numerals and their repetitive descriptions are omitted.

Figure 7A:
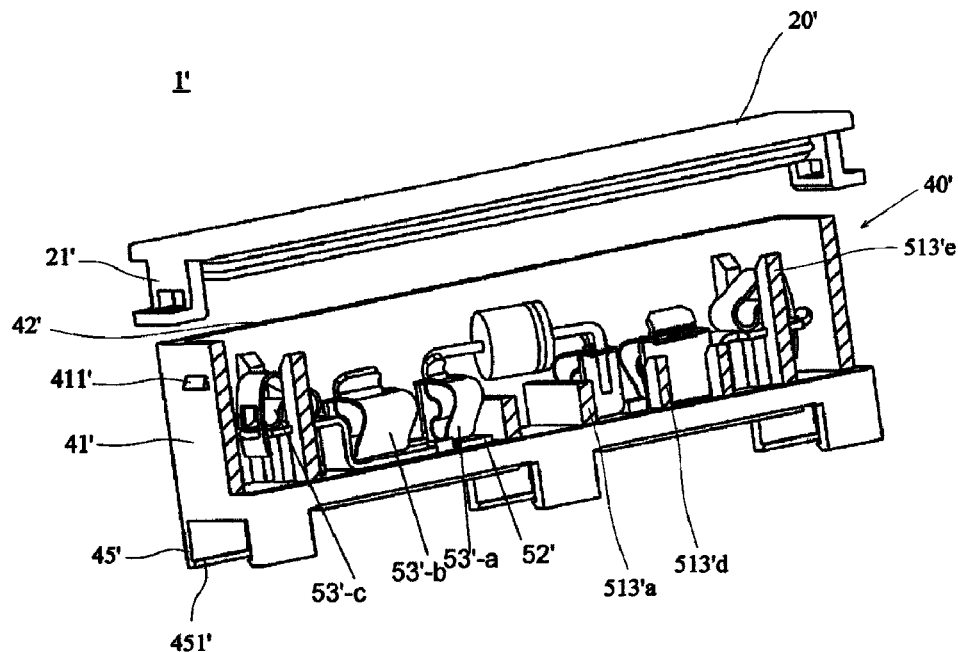
FIG. 7A is a partially sectioned perspective view showing the structure of a junction box according to another embodiment of the present invention.
Figure 7B:
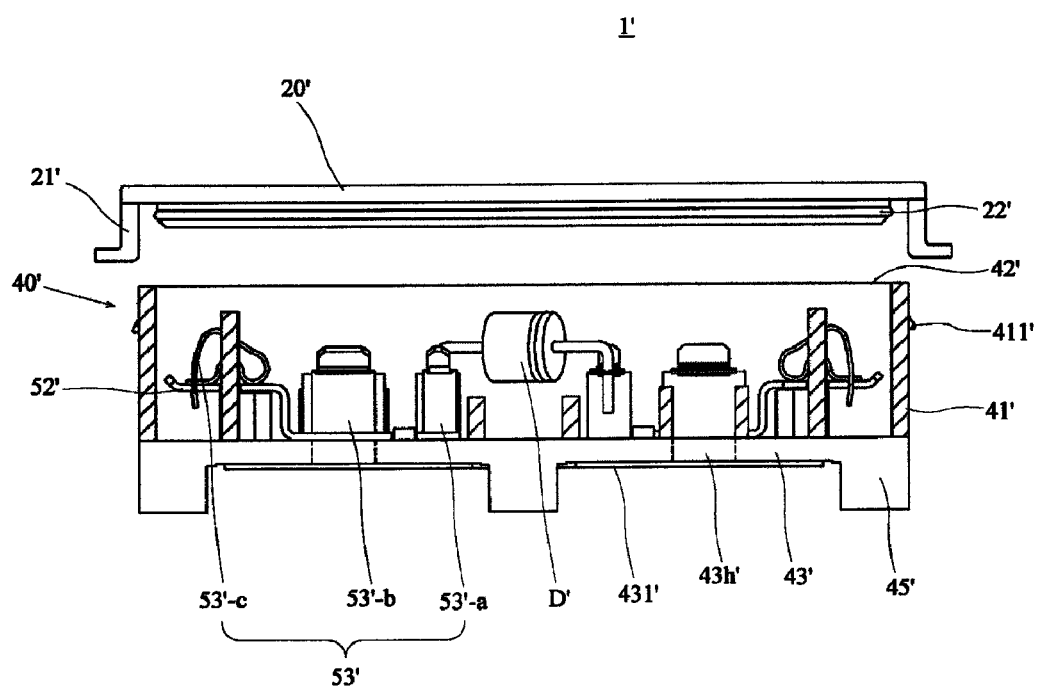
FIG. 7B is a front view showing the structure of a junction box according to the embodiment shown in FIG. 7A.
Figure 8:
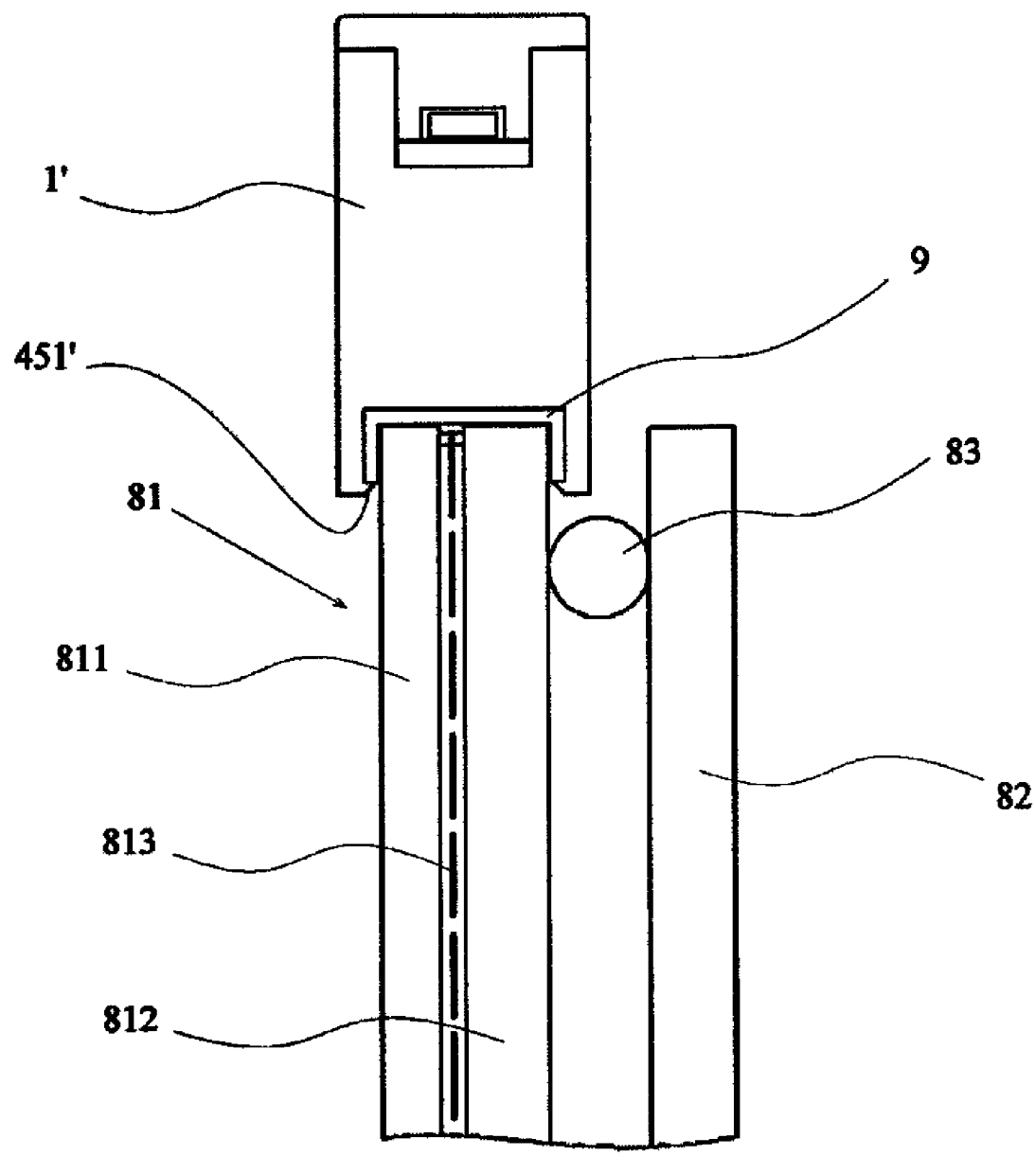
FIG. 8 is a side view showing the junction box according to the embodiment shown in FIGS. 7A and 7B, in a state of being mounted on an edge of a solar cell panel, in which hooks at ends of jaws of the junction box are engaged with a plastic rim extending and disposed along the edge of the solar cell panel.

FIGS. 7A and 7B are partially sectioned perspective and front views, respectively, showing the structure of a junction box 1 according to another embodiment of the present invention, in which one lateral sidewall of a main body 40' of junction box 1' is removed to exhibit the inner structure of the junction box 1'.

Referring to FIGS. 7A and 7B, the BIPV junction box 1' includes an insulating housing and a connection assembly disposed in the housing.

The housing includes the main body 40' and a closing cover 20', which are in a state of to be assembled and are separated from each other in FIGS. 7A and 7B.

The main body 40' has substantially a rectangular parallelepiped shape, and includes two second sidewalls 42' extending in a lengthwise direction, first sidewalls 41' being connected with the two second sidewalls 42' at ends of the second sidewalls 42', and a bottom wall 43'. A plurality pairs of jaws 45' are disposed on the bottom of the main body 40' and extend downwards from the bottom wall 43' along a plane where the second sidewalls 42' lies, so that the main body 40' will be mounted on an edge of the solar cell panel 81 in such a manner that the bottom wall 43' faces the solar cell panel 81 (not shown), which is contrary to the alternative embodiment shown in FIGS. 1-6. There may be one or more pairs of jaws 45' so long as they can clamp the edge of the solar cell panel 81. The main body 40' shown in FIGS. 7A and 7B has three pairs of jaws 45'. Each of the jaws 45' may be provided with a hook 451' on the inward surface thereof at a distal end, which may be engaged with the plastic rim 9 extending and disposed along the edge of the solar cell panel 81 and having a "U" shaped cross section, as shown in FIG. 8. In this case, the plastic rim 9 is formed with holes (not shown) which allow the leads of the solar cell module 813 to pass through. Alternatively, the hook 451' and the plastic rim 9 may be omitted, and in this case, the jaws 45' clamp the edge of the solar cell panel 81 and optionally are adhered thereto with adhesive. The bottom wall 43' may have two lead passageways 43*h*', which allow the leads of the solar cell module 813 to pass through and enter into the main body 40'. The sidewalls 41' and 42' are level with each other at the top opening of the main body 40', which is different from the alternative embodiment shown in FIGS. 1-6. Optionally, there may be ribs 513'*a*, 513'*d* and 513'*e* formed on the bottom wall 43' and connected with the second sidewalls 42' inside the main body 40', which serve to position the connection assembly and/or strengthen the main body 40'. However, the ribs 513'*a*, 513'*d*, and 513'*e* are not indispensable and may be omitted entirely or partially, as long as the stiffness of the main body 40' meets the requirement for use and the position of the connection assembly may be kept constant.

The closing cover 20' covers and closes the top opening of the main body 40' by the engagement of latch catches 21' at ends of the closing cover 20' with protrusions 411' formed on outer surfaces of the first sidewalls 41'. An O-ring 22' is disposed around a raised portion of the closing cover 20', which is formed on a side of the closing cover 20' facing the top opening of the main body 40', so that the sealing between the closing cover 20' and the main body 40' is achieved when the cover 20' is mounted on the main body 40'.

If no external cable 3 is needed to be connected, the first sidewalls 41' of the main body 40' may have no through hole therein, as shown in FIGS. 7A and 7B. In this case, the junction box 1' can connect only the leads of the solar cell module 813 among the external components. Optionally, in the case where no external cable 3 is needed to be connected, spring clamps 53'-c among the spring clamps 53' closer to the first sidewalls 41' for connecting external cables 3 may be omitted.

Referring to FIGS. 7A and 7B again, the connection assembly disposed in the main body 40' comprises two assemblies of conductive rails 52' and the spring clamps 53', but does not comprise the chassis 51 of the first embodiment. The two assemblies of the conductive rails 52' and the spring clamps 53' may be same as each other, and one of the assemblies is rotated by 180° with respect to the other about a central axis of the junction box 1' such that the two assemblies are rotationally symmetrical with respect to each other, in which the central axis is perpendicular to the bottom wall 43' of the main body 40'. As shown in FIGS. 5B, 7A, and 7B, the assemblies of conductive rails and spring lamps in the second embodiment of the invention are substantially the same as those in the first embodiment except that the spring clamp 53'-b for clamping a lead of the solar cell module and the spring clamp 53'-a for clamping a lead of the bypass diode D among the spring clamps 53' are rotated by 90° with respect to those in the first embodiment to have the backs thereof face one of the second sidewalls 42' of the main body 40'. Also, branches (spring-mounting parts) of the conductive rail 52' for mounting the spring clamps are rotated accordingly. In addition, a mouth 533 of the spring clamp 53'-b for clamping a lead of the solar cell module may correspond to a lead passageway 43h' in the bottom wall 43' of the main body 40'. The conductive rails 52' may be fixed within the main body 40' by adhering, clamping, or the like.

The junction box 1', shown in FIGS. 7A and 7B, may further include an O-ring 431' disposed on an outer surface of the bottom wall 43' and enclosing the lead passageways 43h' in the bottom wall 43'. When the junction box 1' is mounted on the edge of the solar cell panel 81, the O-ring 431' is positioned between the bottom wall 43' and a surface of the solar cell panel 81 at the edge facing the bottom wall 43', so that the sealing between the bottom wall 43' and the surface of the solar cell panel is achieved. In an alternative embodiment, the junction box 1' may have no O-ring 431' and the sealing function of the O-ring 431' can be achieved by use of a sealing adhesive.

Figure 9A:
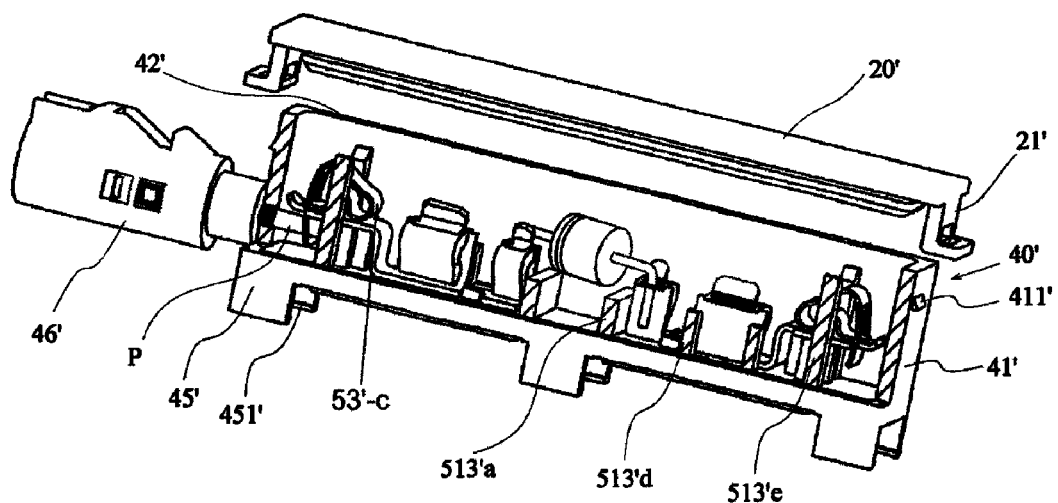
FIG. 9A is a partially sectioned perspective view showing the structure of a junction box according to another embodiment of the present invention.
Figure 9B:
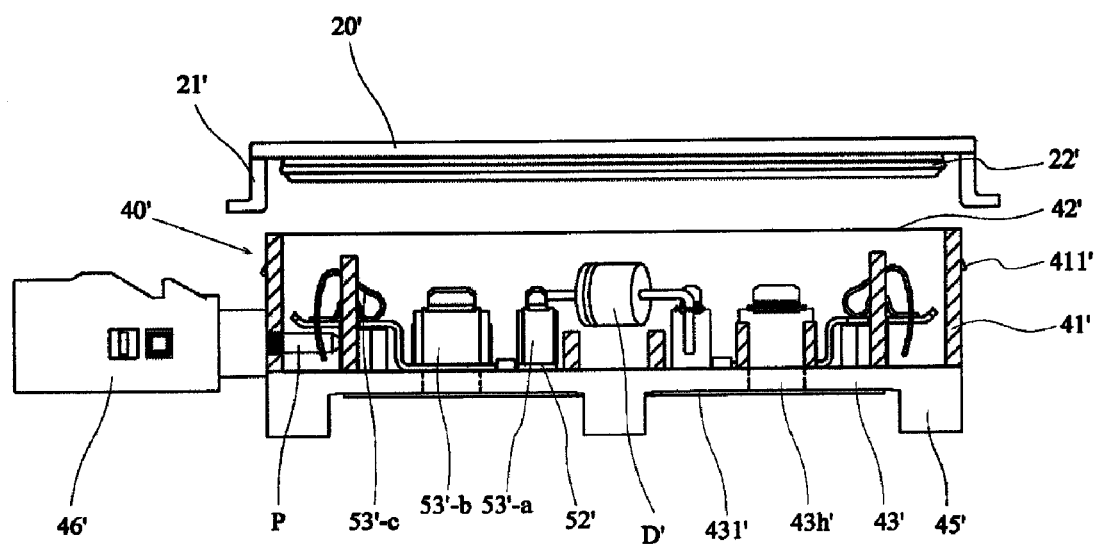
FIG. 9B is a front view showing the structure of a junction box according to the embodiment shown in FIG. 9A.

FIGS. 9A and 9B are partially sectioned perspective and front views, respectively, showing yet another embodiment of the present invention. Similar to FIGS. 7A and 7B, one lateral sidewall of the main body 40' has been omitted in FIGS. 9A and 9B to exhibit the inner structure of the junction box 100. The junction box 100, shown, may be connected to an external cable 3 at one end thereof. The embodiment shown in FIGS. 9A and 9B is substantially the same as the embodiment shown in FIGS. 7A and 7B, except that there is a cylinder-shaped cable socket 46' integrally formed with the main body 40' on an outer surface of the first sidewalls 41', wherein the first sidewalls 41' is at one end of the main body 40'. The cable socket 46' has therein a pin P that extends in an axial direction of the cable socket to penetrate the first sidewalls 41' hermetically and is connected to the connection assembly. The cable socket 46' is used to match with a plug of an external cable 3. Alternatively, the cable socket 46' may be fabricated separately, and then adhere to the first sidewalls 41'. It is possible that the cable socked 46' may be fixed to the first sidewalls 41' by means of other ways. In the case in which both ends of the junction box 100 are connected with external cables 3, another cylinder-shaped cable socket 46' may be formed similarly on the first sidewall 41' of the junction box 100 shown in FIGS. 9A and 9B. The pin P in the cable socket 46' may penetrate the first sidewalls 41', and be inserted in the mouth 533 of the spring clamp 53'-c among the spring clamps 53' located at the end of the main body 40' to be clamped by the spring clamp 53'-c.

The installation of the junction box 100 according to the embodiment shown in FIGS. 9A and 9B may be similar to that according to the embodiment shown in FIGS. 7A and 7B, and therefore a repetitive description is not needed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A building integrated photovoltaic (BIPV) junction box, comprising:
    a housing having first sidewalls positioned opposite to each other, second sidewalls adjacent to and connecting the first sidewalls, and an opening opposite a bottom wall connecting the first and second sidewalls;
    a connection assembly disposed within the housing and connectable to a solar panel; and
    extensions of the second sidewalls which extend beyond a height of the first sidewalls, so that an edge of the solar cell panel is sandwiched between the extensions when the junction box is mounted on the edge of the solar cell panel.

2. The junction box as claimed in claim 1, wherein the extensions are positioned near the opening opposite the bottom wall.

3. The junction box as claimed in claim 2, wherein the extensions comprise at least a pair of jaws.

4. The junction box as claimed in claim 3, wherein each of the jaws has a hook formed on an inner surface at a distal end thereof.

5. The junction box as claimed in claim 2, further comprising a cylinder-shaped cable socket formed on an outer surface of at least one of the first sidewalls, wherein the cylinder-shaped cable socket has therein a pin that extends in an axial direction of the cable socket and penetrates the at least one of the first sidewalls hermetically to be connected to the connection assembly.

6. The junction box as claimed in claim 1, wherein the opening is closed by a closing cover.

7. The junction box as claimed in claim 3, wherein the extensions comprise at least a pair of jaws.

8. The junction box as claimed in claim 7, wherein each of the jaws has a hook formed on an inner surface at a distal end thereof.

9. The junction box as claimed in claim 6, wherein the bottom wall has lead passageways allowing leads of the solar cell panel to pass through.

10. The junction box as claimed in claim 6, further comprising a cylinder-shaped cable socket formed on an outer surface of at least one of the first sidewalls, wherein the cylinder-shaped cable socket has therein a pin that extends in an axial direction of the cable socket and penetrates the at least one of the first sidewalls hermetically to be connected to the connection assembly.

11. The junction box as claimed in claim 1, wherein the extensions comprise at least a pair of jaws.

12. The junction box as claimed in claim 11, wherein each of the jaws has a hook formed on an inner surface at a distal end thereof.

13. The junction box as claimed in claim 1, wherein at least one of the first sidewalls has a receiving passageway therein, which allows an external cable to penetrate the housing and be connected to the connection assembly in the housing.

14. The junction box as claimed in claim 1, further comprising a cylinder-shaped cable socket formed on an outer surface of at least one of the first sidewalls, wherein the cylinder-shaped cable socket has therein a pin that extends in an axial direction of the cable socket and penetrates the at least one of the first sidewalls hermetically to be connected to the connection assembly.

15. The junction box as claimed in claim 14, wherein at least one of the spring clamps has a back thereof face one of the second sidewalk of the housing.

16. The junction box as claimed in claim 14, wherein the connection assembly comprises two sub-assemblies each comprising the conductive rail and the spring clamps, the two sub-assemblies are the same as each other and are rotationally symmetrical with respect to a central axis of the housing perpendicular to the bottom wall of the housing.

17. The junction box as claimed in claim 1, wherein the connection assembly comprises conductive rails and spring clamps for electrically connecting and fixing external cables and leads of the solar cell panel, respectively.

18. The junction box as claimed in claim 17, wherein the connection assembly further comprises an insulating chassis for holding the conductive rails and the spring clamps.

19. The junction box as claimed in claim 1, wherein the connection assembly further comprises a bypass diode for overcurrent protection, the bypass diode is connected in series with the solar cell panel via leads of the solar cell panel.

20. The junction box as claimed in claim 1, wherein the connection assembly further comprises a bypass diode for overcurrent protection, the bypass diode is connected in parallel with the solar cell panel via leads of the solar cell panel.

* * * * *